(No Model.)
A. H. DAVIS & O. E. BYRD.
SHAFT HOLDER FOR VEHICLES.
No. 433,773. Patented Aug. 5, 1890.
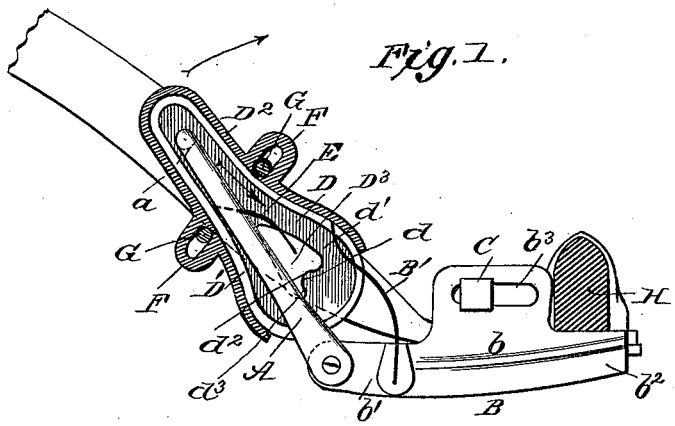
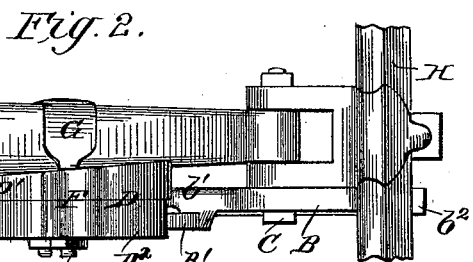
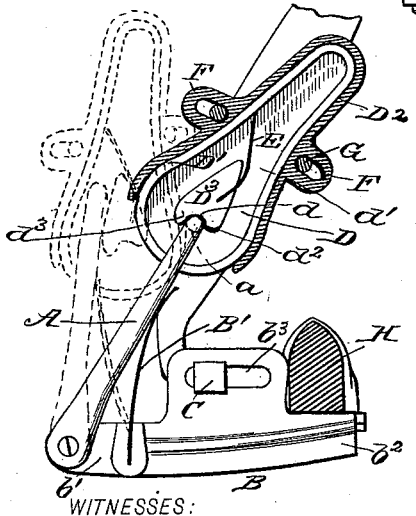
WITNESSES:
Fred G. Dieterich
P. B. Turpin
INVENTOR:
Augustus H. Davis.
Orval E. Byrd.
BY Munn & Co.
ATTORNEYS

UNITED STATES PATENT OFFICE.

AUGUSTUS H. DAVIS AND ORVAL E. BYRD, OF CRAWFORDSVILLE, INDIANA.

SHAFT-HOLDER FOR VEHICLES.

SPECIFICATION forming part of Letters Patent No. 433,773, dated August 5, 1890.

Application filed April 29, 1890. Serial No. 349,980. (No model.)

*To all whom it may concern:*

Be it known that we, AUGUSTUS H. DAVIS and ORVAL E. BYRD, of Crawfordsville, in the county of Montgomery and State of Indiana, have invented a new and useful Improvement in Shaft-Holders, of which the following is a specification.

This invention is an improved shaft-holder for holding up the shafts or thills of buggies or other vehicles when not in use and when it is desired to hitch the horse thereto.

The invention consists in certain novel constructions and combinations of parts, as will be hereinafter described and claimed.

In the drawings, Figure 1 is a side view of the device, the cap or side cover being removed. Fig. 2 is a top plan view. Fig. 3 is a side view, the cap or side cover being removed, the movable parts being shown in different positions in dotted lines, and Fig. 4 is a detail view.

In carrying out the invention we provide a bar A, supported in connection with the vehicle-axle, and a part constructed for engagement by said bar and supported on the thill or shaft. The support B for the bar A is shown as formed with a body part $b$ and front and rear arms $b'$ $b^2$, the body $b$ being provided with an opening $b^3$, preferably a slot, as shown, for the shackle-bolt C, which serves to secure the support B to the shackle, and so to the vehicle-axle, as will be understood from Fig. 1. The rear arm $b^2$ of the support B bears under the axle H, while the arm $b'$ projects forward beyond the shackle and has the bar A pivoted to it near its front end. This bar A projects up from the arm $b'$ and is actuated by a spring B', secured at one end to the arm $b'$ of the support and pressing at its upper end against the rear side of bars A, operating to force the upper free end of said bar forward. At its said upper end the bar A has a stud $a$, which plays in a groove in the part D, connected with the shaft. This part D is shown as a casing formed with a body or main part D' and a cap or side cover D². In the main part D' we form a groove $d'$, which is traversed by the stud $a$ of bar A. In the inner wall of the groove $d'$ we form a notch or seat $d$, the wall $d^2$ of which forms a bearing for resting on the stud $a$, while the front wall $d^3$ serves as a stop to adjust the stud to position for engagement by bearing $d^2$, which part $d^2$, by bearing upon the bar A, serves to hold the shafts up, as desired. The block or portion D³, provided in the part D' and forming the inner wall of groove $d'$, has the notch $d$ in its lower end. A spring E crosses the groove $d'$ at the upper end of block D³, and is so arranged as to permit the stud $a$ to pass up in front of block D³, past or through such spring E, and to direct this stud $a$ in its downward movement in rear of such block. To this end the spring E is preferably secured at one end to the block D³, and arranged to bear at its free end against the wall of groove $d'$ above the block D³, so the spring may be lifted by the stud as it passes up in front of block D³, but will serve to direct such stud on its downward passage down in front of such block D³, the spring E thus serving in a measure as a yielding stop in the path of the stud, for the purpose described.

The side cover or cap D² is fitted to portion D', such parts D' D² being both provided with perforated lugs F for the arms of the clip G, which embraces the shaft, and, when secured by nuts, as shown, operates to hold parts D' D² together and both of said parts to the shaft.

The operation will be readily understood from the drawings. When the parts are in the position shown in full lines, Fig. 3, the bearing-notch $d$ of the bearing part D will bear upon stud of bar A, and the shaft will be held elevated. If it is desired to lower the shaft it should be first raised slightly, when the upper end of bar A will escape from notch $d$ and be sprung forward against the front wall of groove $d'$, when the shafts may be lowered, the stud $a$ moving up groove $d'$ in front of block D³ past spring E. Now, if the shaft be raised the stud $a$ will traverse down the groove in front of the block D³ until it enters the notch $d$, when the shafts will be held elevated until the before-described operation is repeated.

Having thus described our invention, what we claim as new is—

1. A shaft-holder, substantially as described, comprising a bar supported in connection with the axle and a part supported on the shaft and constructed for automatic engagement with the bar when the shaft is lifted to a given point, the shaft and its attached part being movable beyond said point and adapted to be automatically disengaged and freed from the engaging part by the movement of the shaft above the said given point, substantially as and for the purposes set forth.

2. A shaft-holder, substantially as described, comprising a case or portion adapted for connection with the shaft and provided with an endless or continuous groove, the bar having a stud or portion to traverse the groove of the shaft case or portion, and means for connecting the said bar with the axle, all substantially as set forth.

3. In a shaft-holder, the case D, having an endless or continuous groove $d'$ and a yielding stop, as E, combined with the bar A, having a stud or portion to traverse said groove $d'$, all substantially as and for the purposes set forth.

4. In a shaft-holder, substantially as described, the case D, having groove $d'$, formed with notch $d$, having walls $d^2 d^3$ and the spring E, and the bar having a stud or portion to traverse said groove, all substantially as set forth.

5. In a shaft-holder, the case D, having portions $D' D^2$, provided with lugs F, the lugs F of the portion $D' D^2$ being lapped together and provided with coincident perforations to receive the arms of the fastening-clip, substantially as set forth.

6. In a shaft-holder, the combination, with the part or portion supported on the shaft, of the bar pivotally supported in connection with the axle and adapted at its upper free end to engage the part or portion on the shaft, and a spring whereby to actuate said bar to force its upper free end forward, all substantially as and for the purposes set forth.

7. In a shaft-holder, the combination of the support B, having main portion $b$ and front and rear arms $b' b^2$, the bar A, pivoted to arm $b'$, the spring for actuating said bar, and a bearing for engagement thereby adapted for connection with the shaft, substantially as set forth.

8. The improved shaft-holder herein described, consisting of the casing having an endless or continuous groove and provided with a yielding stop, the bar A, having a stud or portion to traverse the groove of the casing, and a spring for actuating such bar, substantially as set forth.

9. In a shaft-holder, substantially as described, a part or portion adapted for connection with the shaft provided with an endless or continuous groove, and having in the wall of said groove a notch or bearing, as $d$, substantially as and for the purposes set forth.

AUGUSTUS H. DAVIS.
ORVAL E. BYRD.

Witnesses:
GEORGE L. WILSON,
HENRY C. LARSH.